May 8, 1951 J. L. BOWMAN 2,552,307
DISK HARROW
Filed Nov. 20, 1947 2 Sheets-Sheet 1
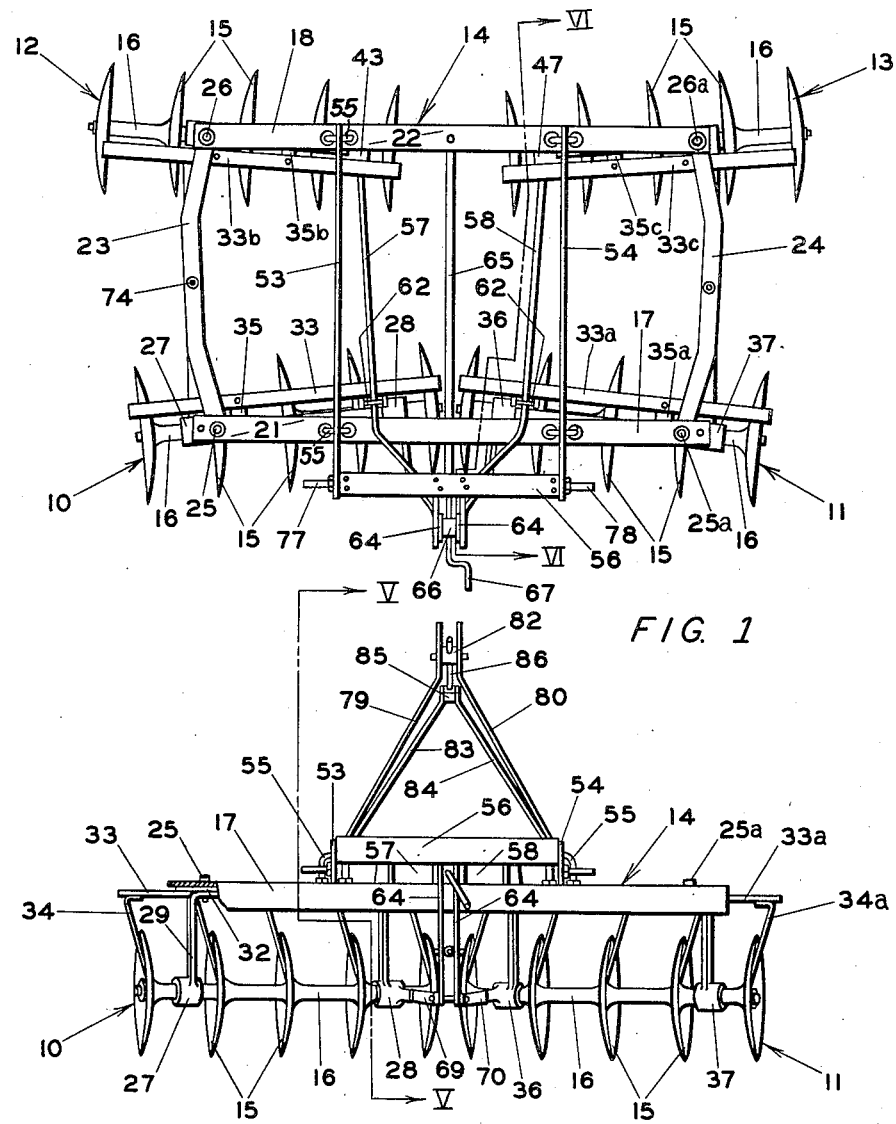
FIG. 1
FIG. 2
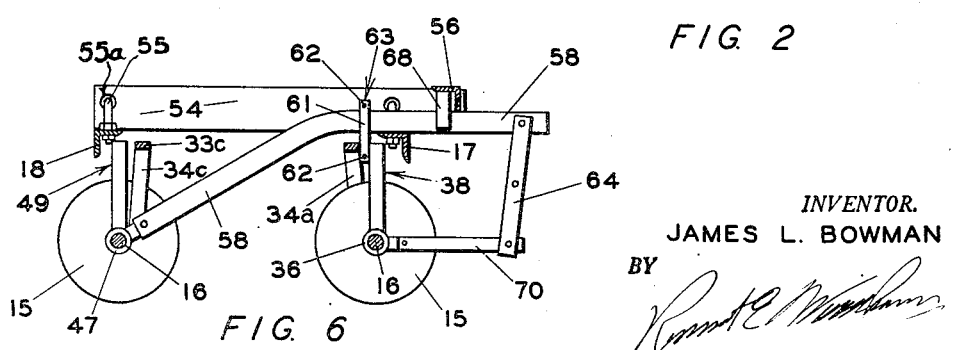
FIG. 6
INVENTOR.
JAMES L. BOWMAN
BY
ATTORNEY May 8, 1951  J. L. BOWMAN  2,552,307
DISK HARROW
Filed Nov. 20, 1947  2 Sheets-Sheet 2

INVENTOR.
JAMES L. BOWMAN
BY
ATTORNEY

Patented May 8, 1951

2,552,307

UNITED STATES PATENT OFFICE 2,552,307

DISK HARROW

James L. Bowman, Eau Claire, Mich., assignor to Rodger F. Becker, Kalamazoo, Mich.

Application November 20, 1947, Serial No. 787,209

6 Claims. (Cl. 55—83)

This invention relates generally to a disk harrow and specifically to a type thereof designed for direct support upon the rear of a tractor.

Prior to the advent of the so-called "lift-type" of tractor, namely, the type carrying mechanism at its rear end for holding and lifting ground working implements as illustrated by United States Patents Nos. 1,687,719, 2,118,180 and 2,118,181, the ground working implements, such as the disk harrow, were loosely secured to the tractor or other prime mover and simply dragged across the ground. These earlier types of harrows were usually transported by truck or wagon from field to field or to the barn.

It will be understood that a harrow having disks is herein referred to for illustrative purposes only. It is perfectly possible that the harrow type frame may be equipped with spring teeth, sweeps or similar ground engaging tools without departing from the scope of the invention. However, for convenience in discussion, a disk harrow will be used to disclose the invention.

The gangs of said earlier disk harrows were very loosely connected together so that they would more readily conform to the uneven contour of a plowed field. Hence, they were too loosely connected to be directly converted to use upon the lift type tractor. Consequently, disk harrows have been developed with a rigid frame from which the gangs of disks are suspended. An example of such a harrow may be found in the Love Patent No. 2,320,624.

In cases where the ground is irregular or uneven, it has been found that a rigid framed harrow does not permit the gangs of disks to follow the contour of the ground as desired mainly because the entire rigid frame of the harrow is in turn rigidly secured to the tractor by an A-frame.

It thus becomes desirable to provide a harrow of substantially rigid frame in which such rigidity is relaxed as much as permissible thereby permitting a maximum flexibility of said disk gangs in conforming to the contour of the ground, without departing from a structure which may still be movably supported upon said lift type tractor.

Accordingly, it is a primary object of this invention to provide a disk harrow designed especially for use with, and movable support upon, the rear of a lift type tractor, which harrow has a frame constructed with minimum permissible rigidity, thereby giving the gangs of harrows supported upon said frame the maximum permissible flexibility for conforming to the contour of the ground.

A further object of this invention is to provide a disk harrow, as aforesaid, in which the rear gangs of disks are flexibly and pivotally connected to the front gangs of disks for reason of strengthening the structure.

Other objects and purposes of this invention will become apparent to persons familiar with this type of equipment upon referring to the accompanying drawings and upon reading the following specification.

In order to meet those objects and purposes heretofore mentioned, as well as others incidental thereto and associated therewith, I have provided an improved disk harrow having a non-rigid frame to which a plurality of disk gangs are non-rigidly secured, the whole having, however, sufficient rigidity to be suspendable on a lift type tractor. Said disk harrow is designed to be fastened to such a tractor by means of a standard A-frame which is secured to a portion of the said non-rigid frame. There are at least two rows of disk gangs, and the adjacent rows of disk gangs are flexibly connected by braces which are non-rigidly fastened to said non-rigid frame. The gangs of disks, which are pivotally suspended from said non-rigid frame, are mutually controlled for angular adjustment by means of a plurality of connecting arms which converge at the front of the disk harrow where their operation is controlled by an adjustment crank.

For illustrations of one, but by no means the only, embodiment of the invention hereinafter described in detail, attention is directed to the drawings in which:

Figure 1 is a top plan view of the disk harrow, to which this invention relates, without the A-frame.

Figure 2 is a front elevation view of the said disk harrow, including said A-frame.

Figure 6 is a cross sectional view of Figure 1 taken along the line VI—VI.

Construction

Figure 3:
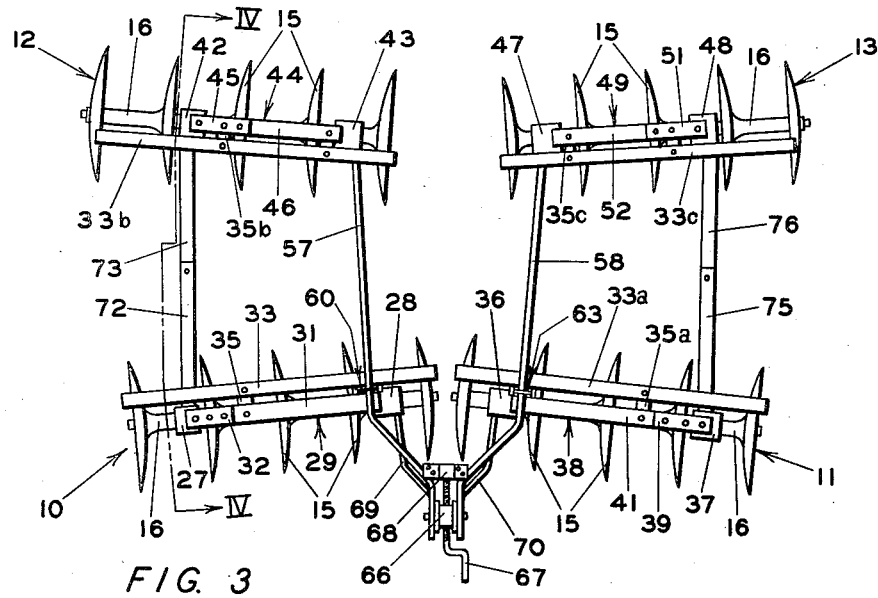
Figure 3 is a top plan view of said disk harrow without the A-frame and without the non-rigid harrow frame.

In the particular embodiment of the disk harrow illustrated in Figures 1, 2 and 3, a plurality of disk gangs, here shown and hereinafter referred to as the left front gang 10, the right front gang 11, the left rear gang 12 and the right rear gang 13, are non-rigidly supported upon a non-rigid frame 14, as hereinafter described in detail. The said gangs may be of any convenient conventional type comprising a plurality, here five, of concave-convex metal disks 15 rotatably supported upon a disk shaft 16.

In order to simplify the following description and claims, the left end of the disk harrow, as appearing in Figures 1, 2 and 3, will be referred to as the "leftward" or "left" end, and the right end of the machine will be referred to as the "rightward" or "right" end. The ends of the disk gangs will similarly be referred to as having "left" or "leftward" and "right" or "rightward" ends. References in the following specification and claims to the directions "upper" and "lower," or derivatives thereof, may be freely used for convenience and clarity, and will refer to the machine, or parts thereof, in their normal position of operation.

Figure 5:
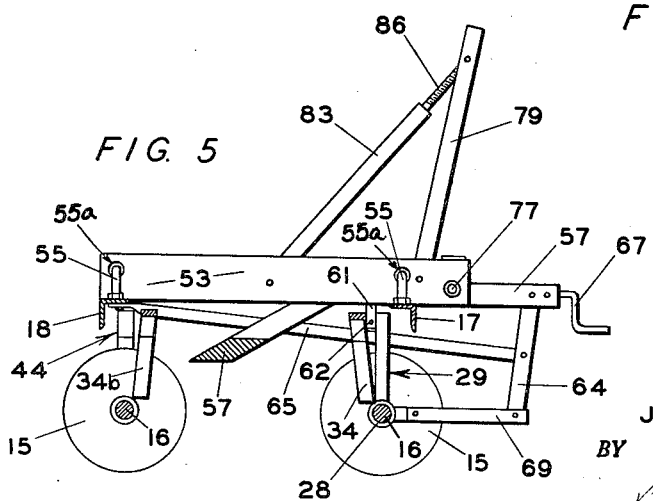
Figure 5 is a cross sectional view of Figure 2 taken along the line V—V.

The non-rigid frame 14 is comprised of a pair of substanitally parallel structural angle members approximately equal in length and hereinafter referred to as the front structural angle member 17 and the rear structural angle member 18. The horizontal flange 21 of the front angle 17 and the horizontal flange 22 of the rear angle 18 lie substantially within the same plane and are normally positioned so that their outside surfaces face upwardly, as shown in Figures 1 and 5.

The adjacent extremities of said structural angle members 17 and 18 are connected by means of a pair of connecting links 23 and 24, which links may be fabricated from any suitable material such as steel bar. Said connecting links 23 and 24 are non-rigidly and adjustably secured to the ends of the flanges 21 and 22 of said structural angles 17 and 18 respectively, by means such as the front bolts 25 and 25a and rear bolts 26 and 26a.

The left front disk gang 10, whose disks in this particular embodiment have their concave sides facing leftwardly as appearing in Figures 1 and 3, is provided with a left bearing 27 and a right bearing 28. Said bearings may be of any convenient, conventional type and each is preferably positioned upon the shaft 16 between the two outside disks at each end of the gang. A U-shaped bracket 29, which may be fabricated from metal such as bar steel, is secured at one extremity to the left bearing 27 and at its other extremity to the right bearing 28. The horizontal portion 31 of said bracket 29 is parallel with and rides directly above the shaft 16 of said left gang 10.

One end of an extension bar 32 is affixed as by bolting, to the leftward end of the horizontal portion 31 of the bracket 29. The other end of said bar 32 is non-rigidly secured to the leftward end of the flange 21 of the front angle 17 by means of a bolt 25.

A disk cleaner support bar 33, from which a plurality of disk cleaners 34 depend, is rigidly affixed to said horizontal portion 31 of the said bracket 29 by means of the connectors 35.

The right front disk gang 11, including the leftward bearing 36, the rightward bearing 37, the bracket 38, and the extension bar 39, is preferably identical with the left front disk gang 10. However, the concave sides of the disks 15 of the right front gang 11 face rightwardly thereby reversing the relative positions of the bearings 36 and 37 and placing the extension bar 39 at the rightward end of the bracket 38.

A disk cleaner support bar 33a with its depending disk cleaners 34a is affixed to the horizontal portion 41 of the bracket 38 by means of the connectors 35a. The extension bar 39 is non-rigidly and pivotally secured to the rightward end of the flange 21 of the front structural angle 17 by means of a bolt 25a.

The left rear disk gang 12, whose disks 15 have their concave sides facing rightwardly, is provided with a leftward bearing 42 around the shaft 16 between the center disk of the gang and that disk immediately adjacent to the left of said center disk. Another bearing 43 is provided about said shaft 16 between the two disks at the rightward end of said left rear gang 12. The bearings 42 and 43 are preferably, but not necessarily, identical to the bearings 27 and 28.

A U-shaped bracket 44, which is similar to the bracket 29 in shape, position and material, is rigidly secured at its extremities to the bearings 42 and 43. One end of an extension bar 45 is affixed, as by bolting, to the leftward end of the horizontal portion 46 of the bracket 44. The other end of said bar 45 is non-rigidly and pivotally secured to the leftward end of the flange 22 of the rear structural angle 18 by means of the bolt 26. A disk cleaner support bar 33b, with its depending disk cleaners 34b, is affixed to the horizontal portion 46 of the said bracket 44 by means of the connectors 35b.

The right rear disk gang 13, including the leftward bearing 47, the rightward bearing 48, the bracket 49 and the extension bar 51, is preferably identical with the left rear disk gang 12. However, the concave sides of the disks 15 of the right rear gang 13 face leftwardly, thereby reversing the relative positions of the bearings 47 and 48 and placing the extension bar 51 at the rightward end of the bracket 49.

A disk cleaner support bar 33c, with its depending disk cleaners 34c, is affixed to the horizontal portion 52 of the bracket 49 by means of the connectors 35c. The extension bar 51 is non-rigidly and pivotally secured to the rightward end of the flange 22 of the rear structural angle 18 by means of a bolt 26a.

A pair of A-frame support bars 53 and 54 of rectangular cross-section are preferably non-rigidly attached to said front and rear structural angles 17 and 18 by means of the U-bolts 55 passing slidably through appropriate openings 55a in the ends of said bars 53 and 54, so that a longitudinal edge of said respective support bars engage the flanges 21 and 22 of said structural angles. The U-bolts are rigidly secured to said flanges 21 and 22 but permit the desired flexion of said support bars 53 and 54 by having clearance between their parallel arms of greater width than the thickness of said bars. It will be evident that the size of said opening 55a with respect to the diameter of the stock from which the U-bolt 55 is made, together with the distance from said opening to the lower edges respectively of the bars 53 and 54 will determine the amount of relative motion permitted between said bars and said U-bolts. However, some motion will in all cases be present and the parts accordingly movable with respect to each other. Said support bars 53 and 54, which may be fabricated from any suitable material, such as steel bar stock, are substantially parallel to each other and perpendicular to said structural angles 17 and 18, and engage said structural angles intermediate their ends.

The adjacent ends of the support bars 53 and 54, which ends extend beyond the front structural angle 17, as shown in Figures 1 and 5, are rigidly engaged in any convenient manner by a structural brace angle 56. Said brace angle 56 is vertically spaced with respect to the front structural angle 17 so as to permit a sliding movement of the left and right rear gang adjustment arms 57 and 58, respectively, between said brace angle 56 and said front structural angle 17, as appearing in Figures 2 and 6.

One extremity of the said left rear adjustment arm 57 is pivotally attached to the right bearing 43 of the left rear gang 12. Said arm 57 passes up and over the left front gang 10 and the front structural angle, as aforesaid, so that its other extremity extends substantially beyond said brace angle 56. One extremity of the said right rear adjustment arm 58 is pivotally attached to the left bearing 47 of the right rear gang 13. Said arm 58 passes up and over the right front gang 11 and the front structural angle 17 so that its other extremity extends beyond said brace angle 56 substantially the same distance as the adjacent end of said arm 57.

The adjustment arms 57 and 58 are preferably approximately parallel with the support bars 53 and 54 from their extremities which engage the rear gangs up to the point where they intersect said front structural angle. At this point, they are bent abruptly towards each other to be mutually and pivotally secured to the upper end of a rocker assembly.

An adjustment arm stirrup 60 is secured to the left front disk gang 10 between the disk cleaner support bar 33 and the horizontal portion 31 of the bracket 29 for the purpose of supporting that end of the said gang 10, remote from the end pivotally attached to the frame 14, upon the left rear gang adjustment arm 57. The stirrup 60 may be comprised, for example, of a pair of substantially parallel steel side bars 61, normally disposed in a vertical position, whose adjacent extremities are rigidly attached to a pair of steel cross rods 62 (Figures 1, 5 and 6). Another stirrup 63, identical in all respects to said stirrup 60 and similarly attached to the right front gang 11, is provided to support the unpivoted end of the said gang 11, upon the right rear gang adjustment arm 58.

Said rocker assembly is comprised of a pair of rocker bars 64 which are pivotally supported, intermediate their extremities, upon one end of a rocker support post 65 whose other end is attached, as by means of a bolt, to said rear structural angle 18 midway between the extremities thereof.

The upper ends of said rocker bars 64 are separated by an adjustment block 66, through which an adjustment crank 67 is threadedly received. One end of said crank 67 is rotatably held by an adjustment bracket 68 (Figure 3), which bracket is rigidly secured to said brace angle 56 (Figures 1 and 6). The lower ends of said rocker bars 64 are pivotally engaged with one pair of the adjacent ends of the left and right front gang adjustment links, 69 and 70 respectively. The other end of each of said adjustment links 69 and 70 is non-rigidly secured, respectively, to the right bearing 28 of the left front gang 10 and the left bearing 36 of the right front gang 11.

Accordingly, when the crank 67 is turned in one direction, the block 66 and the adjacent ends of the rear gang adjustment arms 57 and 58 will be moved, for example, towards the front of the machine, thereby effecting a corresponding movement of the right and left ends of the rear gangs 12 and 13, respectively, to which said adjustment arms are attached. Since said rocker bars 64, which are engaged at their upper ends to said block 66, are pivoted intermediate their extremities upon one end of the rocker support post 65, a movement of said upper ends in one direction will produce a movement of the lower ends of said rocker bars in the opposite direction. Therefore, when said rear gangs are moved forwardly the right end of gang 10 and the left end of gang 11 will be moved towards the rear of the machine, by means of the front gang adjustment links 69 and 70 which connect the inner ends of said front gangs to the lower ends of the rocker bars 64, as aforesaid. An opposite rotation of the crank 67 will produce a reverse movement of the inside ends of the front and rear gangs.

Figure 4:
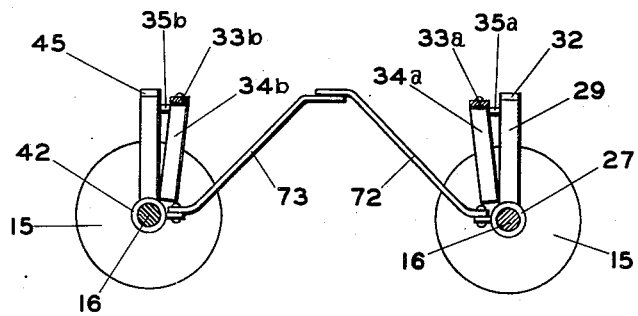
Figure 4 is a cross sectional view of Figure 3 taken along the line IV—IV.

The left front disk gang 10 is directly connected to the left rear gang 12 by means of a pair of couplers 72 and 73 (Figure 4). One end of the coupler 73 is non-rigidly and pivotally secured, as by means of a bolt, to the left bearing 42 of the left rear gang 12 while the other end thereof is pivotally and non-rigidly attached to said left connecting link 23 by means of a suitable bolt 74, intermediate the ends of said connecting link. One end of said coupler 72 is also held non-rigidly and pivotally at one end by said bolt 74 while its other end is likewise engaged with the left bearing 27 of the left front gang 10.

The couplers 72 and 73 are advantageously vertically disposed with respect to the said left connecting link 23 so that the pivot bolts 25 and 26 are substantially in line with the corresponding pivot points between said couplers 72 and 73 and the respective bearings 27 and 42 to which they are attached. Thus, the gangs 12 and 10 are free to pivot, as aforesaid.

The couplers 72 and 73 provide additional bracing for the said gangs 12 and 10, respectively, against strains produced when said disks 15 are engaging the ground during operation.

A pair of couplers 75 and 76, which are identical in all respects with the couplers 72 and 73, are provided between the right front disk gang 11 and the right rear gang 13 for purposes identical to those mentioned above with respect to said couplers 72 and 73.

A support pin 77 is rigidly affixed to that end of the A-frame support bar 53, which is attached to the structural brace angle 56, and extends from the leftward side of said support bar. A support pin 78, similar to the pin 77, is rigidly affixed to the rightward side of the A-frame support bar 54 at the end thereof attached to the structural brace angle 56. The two pins 77 and 78 constitute the two low points of the A-frame by means of which the disk harrow, herein described, is supported upon the rear end of a tractor or other prime mover.

A pair of A-frame upper bars 79 and 80 are rigidly secured, as by bolting, to the support bars 53 and 54, respectively, near the ends thereof to which the support pins 77 and 78 are secured. Said upper bars 79 and 80 converge towards each other so that their upper ends engage opposite sides of a screw block 82, which said upper bars pivotally support.

A pair of upper A-frame braces 83 and 84, which are pivotally secured, as by means of bolts, to the support bars 53 and 54, respectively, intermediate the extremities thereof, also converge at their upper ends where they engage and pivotally support a pivot block 85. Said pivot block 85 is affixed to an adjustment rod 86, which rod threadedly engages said screw block 82. The upper bars 79 and 80 and the upper braces 83 and 84 may be fabricated from any appropriate material such as steel bar stock. The upper extremities of the upper bars 79 and 80 (Figures 2 and 5) constitute the upper or third support point of the said A-frame.

*Operation*

In order to operate and use the disk harrow, whose construction is hereinabove disclosed, the said A-frame is preferably rigidly attached by means of the said three points of support in a conventional manner to the tractor or other prime mover by means of which said disk harrow is drawn across the ground in the manner disclosed in any of the aforementioned Patents Nos. 1,687,719, 2,118,180, and 2,118,181 to H. G. Ferguson.

The attitude of the non-rigid frame 14 is adjusted by means of the adjustment rod 86. The relative angular positions in the horizontal plane of the four disk gangs; 10, 11, 12 and 13 with respect to each other, are set by means of the crank 67 operating in conjunction with the rocker bars 64, the rocker support post 65, the rear gang adjustment arms 57 and 58, and the front gang adjustment links 69 and 70.

An actuation of the crank 67 in one direction will cause the left ends of the right front and right rear gangs 11 and 13, respectively, to move towards each other as they pivot upon the bolts 25a and 26a, and will cause the right ends of the left front and left rear gangs 10 and 12, respectively, to move towards each other as they pivot upon the bolts 25 and 26. An actuation of said crank 67 in the opposite direction will cause said right and left, rear and front disk gangs to pivot away from each other. Thusly, the individual disk gangs may be angularly positioned, as desired, with respect to the non-rigid frame 14 and the path of travel of the entire harrow.

The means of attachment between the A-frame support bars 53 and 54 and the structural angles 17 and 18 between the structural angles 17 and 18 and the connecting links 23 and 24, between the disk gangs and the non-rigid frame 14, between the rear disk gangs 12 and 13 and the rear gang adjustment arms 57 and 58, between the front disk gangs 10 and 11 and the front gang adjustment links, and between the front disk gangs 10 and 11 and the rear gang adjustment arms 57 and 58 by means of the stirrups 60 and 63 may be and are somewhat loose in order that substantial non-rigidity may be attained in an implement which may be, and usually is lifted away from the ground by the attached tractor when said harrow is being transported. This resultant non-rigidity enables the disk gangs 10, 11, 12 and 13 to follow the contour of the ground more readily.

Although the above mentioned drawings and description apply to one particular, preferred embodiment of the invention, it is not my intention, implied or otherwise, to eliminate other variations or modifications which do not depart from the scope of the invention unless specifically stated to the contrary in the hereinafter appended claims.

I claim:

1. In a disk harrow having a right and left side and an A-frame for support upon a lift type tractor, the combination comprising: a non-rigid frame having front and rear, transverse, structural angle members parallel with respect to each other and substantially within the same horizontal plane, right and left connecting links longitudinally arranged and pivotally connecting corresponding extremities of said structural angle members, and a pair of parallel, longitudinally arranged, A-frame support bars non-rigidly secured to said structural angle members intermediate the extremities thereof, the forward ends of said support bars extending beyond said front structural angle member and a structural brace angle located between and engaging said ends; right and left rear disk gangs, one being pivotally secured to each end of said rear structural angle member; right and left front disk gangs, one being pivotally secured to each end of said front structural angle member; coupling means pivotally bracing said left front and left rear gangs directly against said left connecting link, and other coupling means pivotally bracing said right front and right rear gangs directly against said right connecting link; a rocker arm support post having its rearward end secured to said frame and having its forward end extending forwardly beyond said frame; a rocker arm pivoted intermediate its ends upon the extended end of said support post; rear gang adjustment means extending over the top of said forward transverse frame member, secured to each rear gang and pivotally secured to said rocker arm; front gang adjustment means pivotally secured to each front gang and pivotally secured to said rocker arm; means slidably supporting said front gangs upon said rear gang adjustment means; and a crank means adjustably connecting said rocker arm to said frame for moving said front and rear gangs toward and away from each other.

2. In a harrow designed for support upon a lift type tractor, the combination comprising: a non-rigid frame having front and rear, transverse, structural members, a pair of connecting links non-rigidly connecting corresponding ends of said structural members and a pair of longitudinally arranged support bars non-rigidly engaging said structural members intermediate their extremities; rear harrow gangs pivotally secured to said rear structural member at each end thereof; front harrow gangs pivotally secured to said front structural members at each end thereof; coupling means pivotally bracing the respectively outer end of both said front and said rear gangs directly against the respectively adjacent connecting links; a rocker arm support post having its rearward end secured to said frame and having its forward end extended forwardly beyond said frame; a rocker arm pivoted intermediate its ends on said extended end of said support post; rear gang adjustment means extending over the top of said forward transverse frame member, secured to each rear gang and pivotally secured to said rocker arm; front gang adjustment means pivotally secured to each front gang and pivotally secured to said rocker arm; means slidably supporting said front gangs upon said rear gang adjustment means; and a crank means adjustably connecting said rocker arm to said frame for moving said front and rear gangs towards and away from each other; whereby the said gangs may follow the contour of the ground with a minimum of restriction.

3. In a harrow having means for support upon a lift type tractor, the combination comprising: a non-rigid frame having front and rear structural members and a pair of connecting links non-rigidly connecting corresponding ends of said structural members; front and rear harrow gangs pivotally secured at their respectively removed ends to said front and rear structural members, respectively; coupling means bracing said front and rear gangs directly against said connecting links; and means adjustably secured to the front structural member and connected to the respectively adjacent ends of the front and rear harrow gangs for simultaneous movement of the adjacent ends of the front gangs toward and away from the adjacent ends of the rear gangs for adjusting said front and rear gangs angularly with respect to said frame and to each other; whereby said gangs may follow the contour of the ground with the least permissible amount of restrictive impedance by said non-rigid frame.

4. In a harrow designed for support upon a lift type tractor, the combination comprising; a non-rigid frame having front and rear, transverse, structural members, a pair of connecting links non-rigidly connecting corresponding ends of said structural members and a pair of longitudinally arranged support bars non-rigidly engaging said structural members intermediate their extremities; rear harrow gangs pivotally secured at their respective outer ends to said rear structural member at each end thereof; front harrow gangs pivotally secured near their respective outer ends to said front structural members at each end thereof; coupling means pivotally bracing the respectively outer ends of both said front and said rear gangs directly against the respectively adjacent connecting links; a rocker arm support post having its rearward end secured to said frame and having its forward end extending forwardly beyond said frame; a rocker arm pivoted intermediate its ends on said extended ends of said support post; rear gang adjustment means extending over the top of and lying against said forward transverse frame member, secured to each rear gang at a point inwardly of its point of pivot and pivotally secured to said rocker arm; front gang adjustment means pivotally secured to each front gang at a point on each spaced inwardly from its point of pivotal support and pivotally secured to said rocker arm; means supporting the inner ends of said front gangs; and a crank means adjustably connecting said rocker arm to said frame for moving said front and rear gangs towards and away from each other.

5. In a ground working implement designed for support upon a lift type tractor, the combination comprising: a non-rigid frame having front and rear, transverse, structural members, a pair of connecting links non-rigidly connecting corresponding ends of said structural members and a pair of longitudinally arranged support bars non-rigidly engaging said structural members intermediate their extremities; rear gangs of ground working tools pivotally secured at their respective outer ends to said rear structural member at each end thereof; front gangs of ground working tools pivotally secured near their respective outer ends to said front structural member at each end thereof; coupling means pivotally bracing the respectively outer ends of both said front and said rear gangs directly against the respectively adjacent connecting links; a rocker arm support post having its rearward end secured to said frame and having its forward end extending forwardly beyond said frame; a rocker arm pivoted intermediate its ends on said extended end of said support post; rear gang adjustment means extending over the top of and lying against said forward transverse frame member, secured to each rear gang at a point inwardly of its point of pivot and pivotally secured to said rocker arm; front gang adjustment means pivotally secured to each front gang at a point on each spaced inwardly from its point of pivotal support and pivotally secured to said rocker arm; means supporting the inner ends of said front gangs and a crank means adjustably connecting said rocker arm to said frame for moving said front and rear gangs towards and away from each other.

6. In a disk harrow having an A-frame for support upon the rear of a lift type tractor, the combination comprising: a frame having front and rear, transverse, structural members parallel with each other and substantially within the same horizontal plane, a pair of longitudinally arranged, connecting links pivotally connecting the corresponding extremities of said structural members, and a pair of parallel, longitudinally arranged, A-frame support bars secured to both said structural members intermediate the extremities of each thereof, the forward ends of said support bars extending beyond said front structural member, and a structural brace member located between and connecting said ends; a pair of rear disk gangs, one pivotally secured to each end of said rear structural member; a pair of front disk gangs, one pivotally secured to each end of said front structural member; a pair of couplers disposed to extend downwardly from one connecting link toward said disk gangs, said couplers being non-rigidly engaged at their respective upper ends, to said one connecting link intermediate its extremities and at their lower respective ends being pivotally secured to the outer ends of the front and rear gangs on the side adjacent said one connecting link; another pair of couplers non-rigidly engaged at their respective upper ends to the other connecting link intermediate its extremities and the lower respective ends being pivotally secured to the outer ends of the front and rear disk gangs on the side adjacent said other link; a rocker arm support post having its rearward end secured to said frame and having its forward end extending forwardly of said frame; a rocker arm pivoted intermediate its ends on said extended end of said support post; a rear gang adjustment means extending over the top of said front structural member, secured to each rear gang and pivotally secured to said rocker arm; front gang adjustment means pivotally secured to each front gang and pivotally secured to said rocker arm; means slidably supporting said front gangs upon said rear gang adjustment means; and a crank means adjustably connecting said rocker arm to said frame for moving said front and rear gangs toward and away from each other.

JAMES L. BOWMAN.

REFERENCES CITED

The following references are of record in the file of this patent:

UNITED STATES PATENTS

| Number | Name | Date |
| --- | --- | --- |
| 1,036,652 | Lathrop | Aug. 27, 1912 |
| 1,070,014 | Christianson | Aug. 12, 1913 |
| 1,079,746 | Christianson | Nov. 25, 1913 |
| 1,189,890 | Warne | July 4, 1916 |
| 2,320,624 | Love | June 1, 1943 |